UNITED STATES PATENT OFFICE 2,681,878

INSECT REPELLENT COMPOSITIONS

Toivo A. Kauppi, Midland, Mich., assignor to Dow Corning Corporation, Midland, Mich., a corporation of Michigan No Drawing. Application September 4, 1951, Serial No. 245,098

3 Claims. (Cl. 167—22)

The subject of this invention is an improved insect repellent composition suitable for use on human skin.

The insect repellent composition of this invention comprises (1) an insect repellent, and (2) an organopolysiloxane of the formula

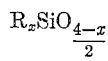

where R is a monovalent hydrocarbon radical and $x$ is from 1.0 to 3.0, average.

During the last decade, intensive research has been carried on for materials capable of repelling insects and suitable for use on or about human beings. As a consequence, several compounds having the property of repelling insects such as mosquitoes, flies, gnats, chiggers, mites and the like, have been developed which may be safely applied to human skin. Foremost among these at present are such compounds as 2-phenylcyclohexanol, 2-cyclohexylcyclohexanol, dimethylcarbate, dimethyl phthalate, n-butyl mesityl oxide oxalate and 2-ethyl 1,3 hexane diol. The forementioned compounds are characterized by being insect repellent, having at the most occasional and very minor toxicity, and having a low volatility at ordinary skin temperatures.

Although these compounds have very effective insect repellent characteristics, they have been found to be effective only for limited periods of time, necessitating repeated and often inconvenient applications of the material to the skin. At the present time, these repellents have an average effectiveness of approximately 2 hours. As they are generally of low volatility, it is possible that they are absorbed in the skin and thereby rendered ineffective.

It is the object of this invention to produce an insect repellent composition which will be effective for much longer periods of time.

It has been found that by incorporating an organopolysiloxane in the insect repellent that the period of effectiveness can be greatly increased. This effect of the organopolysiloxane was completely unexpected and could not be deduced from the general polysiloxane properties.

The organopolysiloxanes of this invention are generally incompatible with the insect repellent agents. Hence, it is preferable to combine them in an emulsion or a solution. Any organopolysiloxane fluid is suitable, however, those boiling above 100° C. are preferred. Any solid organopolysiloxane may also be used as long as such solid polymer is soluble in organic solvents. Polysiloxanes having silicon bonded monovalent hydrocarbon radicals such as methyl, ethyl, propyl, butyl, phenyl, benzyl, vinyl, allyl, chlorophenyl or combinations of these radicals may be utilized.

If it is desired to prepare these repellent compositions in emulsion form, emulsifying agents of common use in the cosmetic and food industries are suitable. Among these are nonionic emulsifiers such as polyethylene oxide stearate and glyceryl monostearate; anionic emulsifiers such as tri-isopropanolamine stearate and tri-isopropanolamine oleate; certain "Spans" and "Tweens" such as polyoxyethylene sorbitan monostearate, and sorbitan monooleate, etc.; cationic emulsifying agents having no adverse physiological activity may also be used. The emulsions can be water-in-oil, oil-in-water or oil-in-oil emulsions.

For mutual solutions of the insect repellent and the organosiloxane, any effective solvent or solvent mixture may be used which is physiologically inert or harmless. Mixtures of any various petroleum fractions and alkyl alcohols have been found very suitable. For example, isopropane alone or in admixture with Stoddard Solvent is highly recommended. It is to be understood that many other solvents may be equally effective.

The order of addition of the components either for an emulsion or solution form is immaterial. For preparing an oil-in-water emulsion it has been found convenient to dissolve the emulsifying agent in water, add the insect repellent compound, followed by the organosiloxane, and agitate the mixture to form an emulsion.

The proportions of the ingredients are not generally critical. It has been ascertained, however, that there should be at least 2 per cent by weight of the polysiloxane based on the total weight of the insect repellent. The other ingredients, if any, may be added in such amount as to effect solution or emulsification. As the proportion of the insect repellent is decreased below 50 percent based on total weight of the composition, there is a gradual reduction in the strength and duration of repellency.

The compositions in the following examples were prepared as heretofore indicated and are not to be construed as limiting the invention.

*Example 1*

A composition in emulsion form having the following components in percentages by weight, unless otherwise indicated, was prepared.

Per cent
70% (by vol.) 2-phenylcyclohexanol and 30%
(by vol.) 2-cyclohexylcyclohexanol_____ 59.2

| | Per cent |
|---|---|
| Dimethylpolysiloxane fluid, 1,000 cs | 6.6 |
| Polyethyleneoxide stearate | 10.5 |
| Glyceryl monostearate | 10.5 |
| Water | 13.2 |

The above composition was tested and found to maintain its insect repellent properties on human skin.

*Example 2*

The following composition was prepared in solution form. All percentages are by weight, unless otherwise indicated.

| | Per cent |
|---|---|
| 70% (by vol.) mixture of 2-phenylcyclohexanol and 30% (by vol.) 2-cyclohexylcyclohexanol | 64.3 |
| 70% by weight of a resinous copolymer containing 38 mol per cent $(CH_3)_3SiO_{1/2}$, and 62 mol per cent $SiO_2$ (R/Si=1.14) dissolved in 30% by weight dimethylpolysiloxane fluid (50 cs.) | 7.1 |
| Isopropanol | 28.6 |

The composition of Example 2 was found to maintain its insect repellent properties.

*Example 3*

A composition of the formula (all percentages are by weight):

| | Per cent |
|---|---|
| 2-ethyl-1,3-hexanediol | 57.8 |
| The siloxane of Example 2 | 6.4 |
| Isopropanol | 25.6 |
| Stoddard solvent | 10.2 | was found to be highly effective as an insect repellent.

*Example 4*

When benzene soluble ethyl, propyl, butyl, phenyl, vinyl, allyl, benzyl and chlorophenyl siloxanes are employed in the composition of Example 1 together with dimethyl carbate, dimethyl phthalate, and n-butyl mesityl oxide oxalate, suitable insect repellents are obtained.

That which is claimed is:

1. A composition of matter comprising a non-toxic insect-repellent compound and an organic solvent soluble organopolysiloxane of the formula $$R_xSiO_{\frac{4-x}{2}}$$

where R is selected from the group consisting of monovalent hydrocarbon radicals and chlorophenyl radicals and $x$ has an average value from 1 to 3, inclusive, said siloxane being present in amount of at least 2 per cent by weight based on the weight of the insect-repellent compound.

2. A composition of matter in accordance with claim 1 in which R is a methyl radical.

3. A composition of matter in accordance with claim 1 in which the insect repellent is selected from the group consisting of 2-ethyl 1,3-hexanediol, 2-phenylcyclohexanol and 2-cyclohexylcyclohexanol.

References Cited in the file of this patent

UNITED STATES PATENTS

| Number | Name | Date |
|---|---|---|
| 1,471,344 | Loudin | Oct. 23, 1923 |
| 1,911,551 | Cleveland | May 30, 1933 |
| 2,163,104 | Salzberg | June 20, 1939 |
| 2,413,803 | Tribit | Jan. 7, 1947 |
| 2,512,192 | Yen et al. | June 20, 1950 |

OTHER REFERENCES

Soap and Sanitary Chemicals, article by Jones et al., pages 111–114 and 155, November 1945.

Barondes et al.: Article in "The Military Surgeon," May 1950, volume 106, Number 5, pages 379 to 387.